Dec. 22, 1964   N. F. HOUGHTON   3,161,916
FORMING APPARATUS
Filed Dec. 5, 1961
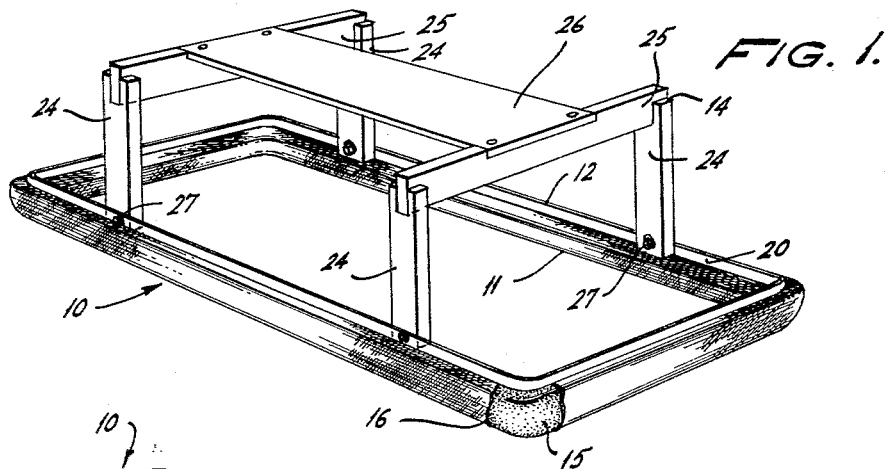
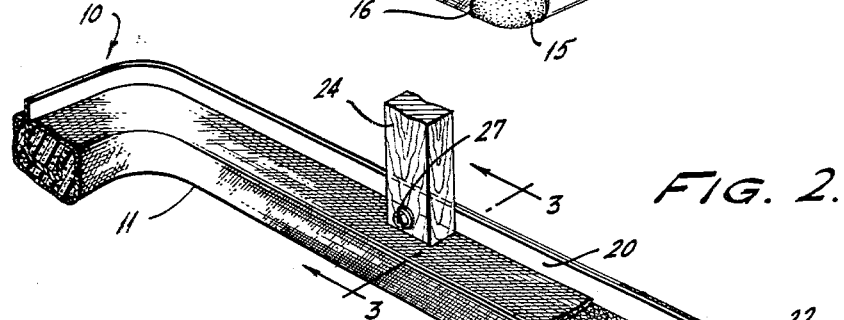
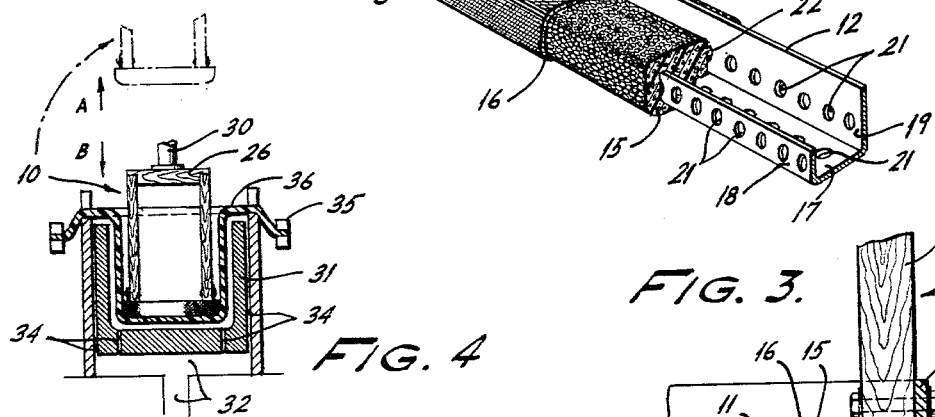
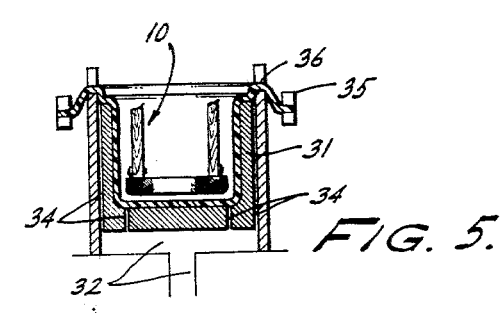
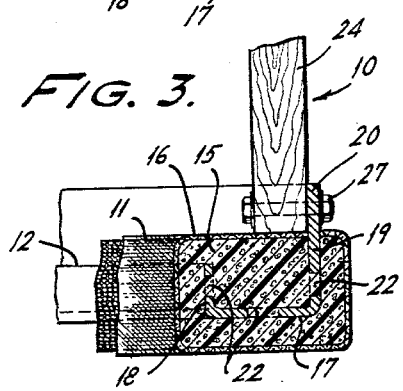
INVENTOR.
NORMAN F. HOUGHTON
BY
ATTORNEY United States Patent Office 3,161,916
Patented Dec. 22, 1964

3,161,916
FORMING APPARATUS
Norman F. Houghton, Philadelphia, Pa., assignor to Philco Corporation, Philadelphia, Pa., a corporation of Delaware
Filed Dec. 5, 1961, Ser. No. 157,192
3 Claims. (Cl. 18—19)

The present invention relates to forming apparatus, more particularly to so called "assist-plugs" which are employed in forming deep-drawn articles from thermoplastic sheet material.

In producing an article of the variety stated above, the assist-plug is brought into contact with a heat softened thermoplastic sheet to carry the same into a forming die, and it is of great importance that the plug be such that it does not unevenly chill the heat laden plastic sheet since such chilling results in an article which evidences objectionable uneven wall thickness. Attempts to overcome these defects by employing assist-plugs made of insulating material, such as wood, have left much to be desired because such plugs produce undesirable streaks, blemishes and weakened areas throughout the wall structure of the deep-drawn article.

This invention deals with the structural and physical aspects of assist-plugs of the insulating type, and the principal object of the invention is to improve the performance and reliability of such plugs. In pursuing this end, I made the surprising discovery that assist plugs made of rigid, cellular plastic foam of a type such as is produced by the reaction of an isocyanate with a suitable hydroxyl bearing compound, as well as foams of the recently developed epoxy type, perform exceptionally well overcoming all of the above noted difficulties and problems.

Other known efforts to remedy the foresaid defects have employed heating means adapted to maintain the temperature of a metal plug at a level more compatible with that of the softened plastic sheet. However, the use of such heating means requires elaborate, expensive and often unreliable control mechanism and the metal plug itself is very expensive. It is therefore another objective of this invention to provide an improved assist-plug device which eliminates heating means and controlling mechanism therefor and yet is capable of producing deep-drawn articles characterized by uniform wall thickness throughout their structure.

The nature of the invention, as well as its objectives and advantages, will be more fully understood from the following description based on the accompanying drawing, in which:

FIGURE 1 is a perspective view illustrating a preferred assist-plug arrangement embodying the principles of this invention;

FIGURE 2 is an enlarged perspective view, partly in elevation and partly in section, of a portion of the arrangement illustrated in FIGURE 1;

FIGURE 3 is an enlarged sectional detail view looking in the general direction of arrows 3—3 of FIGURE 2; and FIGURES 4 and 5 are explanatory views drawn on a reduced scale, diagrammatically illustrating the function of the arrangement shown in FIGURE 1 when used in making deep-drawn thermoformed articles.

Having more particular reference to the drawing, there is illustrated an assist-plug arrangement 10 which comprises an assist-plug portion 11, a reenforcing member 12 and a supporting structure 14. While adaptable for use as an assist-plug in the fabrication of various types of deep-drawn thermoplastic articles, the arrangement of the invention is especially advantageous when employed to assist in the formation of deep rectangular tank-shaped structures, for example, structures which constitute inner liners for domestic refrigerator cabinets, and it is in connection with such structures that the invention will be described.

As shown in FIGURE 1 of the drawing, the assist-plug portion 11 consists of a firm body 15 of molded rigid foam plastic encased in an outer protective covering 16 of textile material. The body 15 comprises foam of the above stated type which have high thermal insulative and low thermal conductive properties, and the covering 16 is made of lightweight fabric which prevents the foam plastic from losing its homogeneous structure when used in the process of thermoforming deep-drawn articles from heated thermoplastic sheet material. In the illustrated embodiment, the outer covering 16 consists of cheesecloth tightly wrapped about and adhesively or otherwise adherently affixed to the outside surface of the rigid foam plastic body 15.

The reenforcing member 12 consists of a rigid frame which is embedded in the body 15 of foam plastic and to which the supporting structure 14 is anchored. As best seen in FIGURE 2, the frame constituting the reenforcing member 12 which preferably is fabricated from aluminum stock, is provided with a bottom wall 17, a narrower side wall 18 and a wider side wall 19, the latter having a marginal portion 20 projecting outwardly of the aforesaid foam plastic body 15. The walls 17 and 18, and that part of the walls 19 which lie within the body 15, are each provided with a row of equidistant perforations 21. These perforations, as more clearly shown in FIGURE 3, are occupied by solid fillets 22 of the foam plastic which firmly anchor the body 15 onto the reenforcing member 12.

The supporting structure 14 consists of upstanding arms 24, crosspieces 25, and a connecting platform 26. The arms 24 are arranged in pairs and are fixedly anchored, as by means of bolts 27, to the extended marginal portion 20 of the reenforcing member 12. The crosspieces 25 are connected to and brace the pairs of arms 24, whereas the connecting platform 26 is connected to said crosspieces and spans the distance therebetween.

The rigid foam plastic body 15 which surrounds the reenforcing member 12 and determines the shape of the "assist-plug" can be and preferably is formed according to customary compression molding procedures in that the member 12 is housed within an appropriately designed mold into which metered quantities of foam producing reactants are fed. Chemical reaction of the mixture confined within the mold causes such mixture to expand thus producing the foam plastic body 15 having the characteristic and constructional features noted above. Following this molding operation, the solidified foam plastic body 15 is covered with the previously described protective covering 16, and the supporting structure 14 is attached to the reenforcing member 12 in the manner previously described to complete the assist-plug arrangement 10.

The manner in which this arrangement is used to assist in the formation of deep-drawn thermoplastic articles will be more clearly understood by referring to explanatory FIGURES 4 and 5 of the drawing.

As represented in FIGURE 4 the assembled assist-plug arrangement 10 is connected to a reciprocating plunger 30 which is fastened to the connecting platform 26 so that said arrangement moves up and down, as represented by arrows A and B, for placement into and out of a concave forming die 31 which is incorporated in a conventional thermoforming machine (not shown). As is known in the art, such a machine has air passage ducts 32 and ports 34, as well as a clamping frame 35 for positioning and retaining a heat softened thermoplastic sheet 36 over the open end of the forming die 31.

In the operation of a machine of the kind mentioned above, the assist-plug arrangement 10 is initially located out of the die 31, that is to say in the position represented in broken lines in FIGURE 4, and the softened plastic sheet is placed above the open end of said die. The assist-plug arrangement 10 is then lowered to carry the softened sheet 36 into the forming die 31 and, as is represented in FIGURE 4, after the assist-plug arrangement has reached its lowermost position, the air is withdrawn from the interior of the die 31 through the ports 34 and ducts 32. The withdrawal of the air creates a vacuum which causes the sheet 36 to leave the assist-plug arrangement and to be forcibly drawn onto the forming wall surfaces of the die 31 where said sheet remains until cooled sufficiently to set in the shape of said die surfaces.

When used as described above, the assist-plug arrangement 10, because of the high insulative and low conductive characteristics of its rigid foam plastic body 15, has no appreciable cooling effect on the heated softened sheet 36 so that the wall thickness of the deep-drawn articles is not affected by contact of said arrangement with said sheet. Moreover any tendency of the rigid foam plastic body 15 to deteriorate upon contact with the heat-laden plastic sheet 36 is counteracted by the protective covering 16. In other words, the covering 16 protects the rigid foam plastic body 15 against heat when coming in contact with the heated plastic sheet material.

From the foregoing description, it will be recognized that this invention provides a novel approach to the problems of overcoming the drawbacks of heretofore known assist-plug devices, and that the rigid cellular plastic foam employed in accordance with the invention surprisingly solves these problems.

It will be appreciated that the invention, while shown in its preferred embodiment, is not limited to specific structures of that embodiment, but embraces such changes and variations as come within the scope of the subjoined claims.

What I claim is:

1. An assist-plug arrangement to be mounted in a machine for forming deep-drawn articles from heated thermoplastic sheet material, comprising: a plug portion consisting of a firm body of rigid cellular foam plastic; a member for reinforcing and mounting said body, said member being constructed of rigid material embedded in said body to reinforce the same and having portions disposed exteriorly of said body to mount the latter; and a protective covering for said body, said covering consisting of lightweight fabric wrapped about and affixed to the outside of said body to protect it against heat when coming in contact with the heated thermoplastic sheet material.

2. An assist-plug arrangement as set forth in claim 1, in which the reinforcing and mounting member has right angularly disposed walls surrounded by the rigid cellular plastic foam and provided with apertures through which fillets of said foam pass to anchor the plug body to said member, one of said walls projecting outwardly of said body to provide for the mentioned mounting portions thereof.

3. An assist-plug arrangement as set forth in claim 1, in which the textile material constituting the outer protective covering for the firm body of rigid cellular plastic foam, has the characteristics of cheesecloth.

References Cited in the file of this patent

UNITED STATES PATENTS

| 2,091,542 | Frati | Aug. 31, 1937 |
| 2,282,423 | Kopitke | May 12, 1942 |
| 2,459,120 | Sparagen | Jan. 11, 1949 |
| 2,531,539 | Smith | Nov. 28, 1950 |

FOREIGN PATENTS

| 604,133 | Canada | Aug. 30, 1960 |
| 609,317 | Canada | Nov. 22, 1960 |

OTHER REFERENCES

Plastics World, "Ridge Forming," September 1947, page 6.